Oct. 8, 1940.   R. S. SANFORD ET AL   2,216,855
VALVE MECHANISM
Filed Aug. 17, 1938
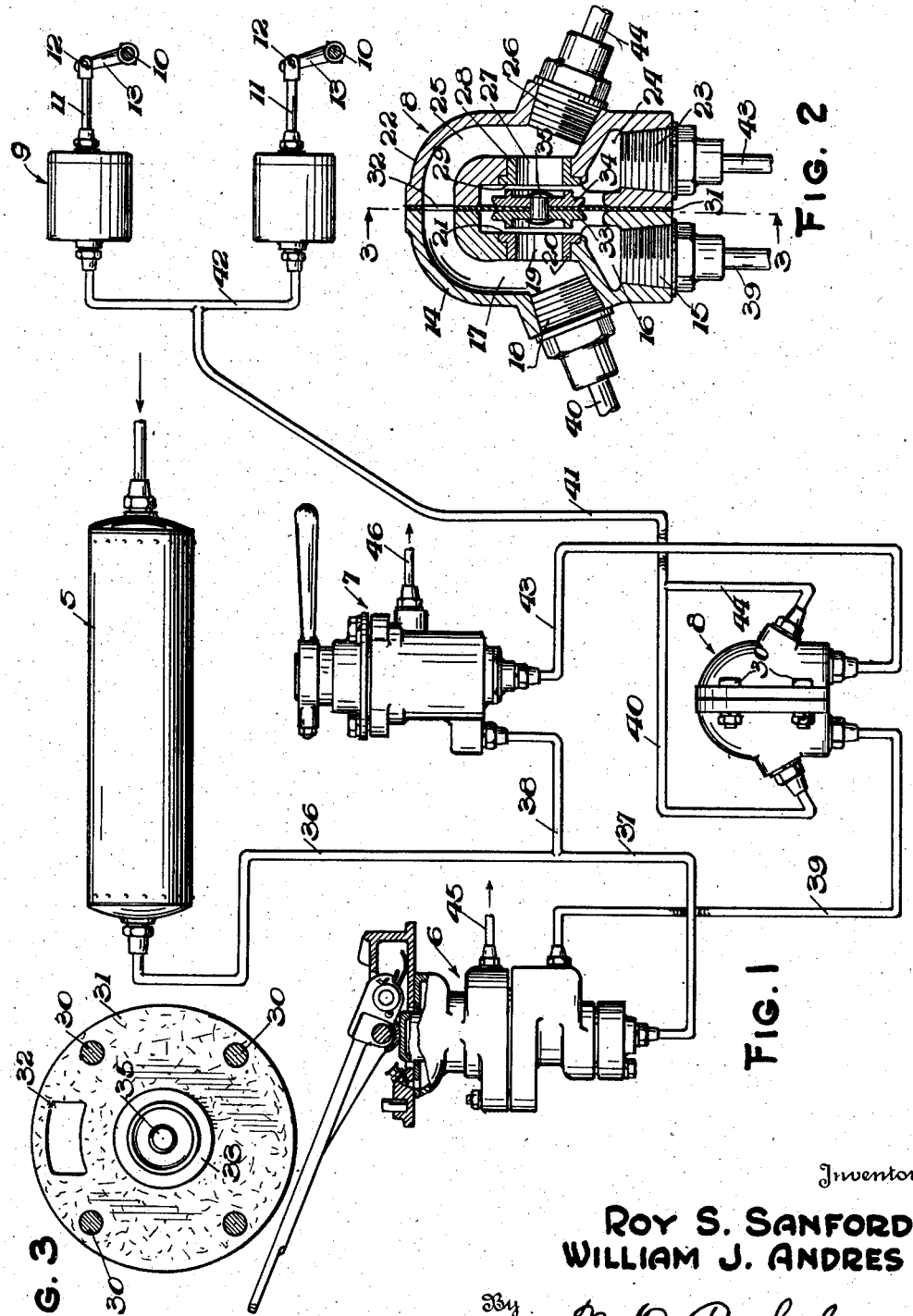
Inventors
ROY S. SANFORD
WILLIAM J. ANDRES
By N. D. Parker Jr.
Attorney Patented Oct. 8, 1940

2,216,855

UNITED STATES PATENT OFFICE 2,216,855

VALVE MECHANISM

Roy S. Sanford and William J. Andres, Pittsburgh, Pa., assignors to Bendix-Westinghouse Automotive Air Brake Company, Pittsburgh, Pa., a corporation of Delaware Application August 17, 1938, Serial No. 225,434

2 Claims. (Cl. 251—118)

This invention relates to control valve mechanism, and more particularly to an improved valve mechanism suitable for use with fluid pressure brake systems.

It is often desirable in fluid pressure brake systems to control a brake actuator or set of brake actuators from different control stations, and since the control valves used in such apparatus have ports for connecting the actuator with atmosphere when in brake release position, it is necessary to provide a transfer or double check valve in the system so constituted as to prevent the flow of fluid pressure from one control valve to the atmospheric port of the other valve when a brake application is made by operation of the first valve. It is also desirable in many cases to have the fluid exhausted from the actuator through the control valve which originally supplied fluid to the actuator, and the transfer valve should also be so constructed as to avoid leakage and must be incapable of assuming a position such that on simultaneous brake applying operation of the control valves the flow of fluid to the actuator from the control valves will be prevented.

It is accordingly one of the objects of the present invention to provide in a simple and efficient structure a novel transfer valve device which shall be so constituted as to secure the above-noted advantages.

Another object is to provide a valve device in a system of the above type which will at all times insure a positive application of the brakes.

Another object is to provide in a valve of the above type a structure which shall be substantially leak proof during all conditions of operation thereof.

A still further object is to provide in a fluid pressure actuator system a transfer valve which shall be relatively simple in construction as well as economical of manufacture, and at the same time be capable of efficient operation over a long period of service.

Other objects and novel features of the invention will appear more fully hereinafter from the following detailed description when taken in connection with the accompanying drawing illustrating a preferred embodiment of the invention. It is to be expressly understood, however, that the drawing is employed for purposes of illustration only and is not designed as a definition of the limits of the invention, reference being had for that purpose to the appended claims.

In the drawing, wherein similar reference characters refer to like parts throughout the several views:

Fig. 1 is a diagrammatic view of a fluid pressure brake system including a transfer valve device constructed in accordance with the principles of the present invention;

Fig. 2 is a sectional view of the valve device illustrated in Fig. 1, and

Fig. 3 is a plan view of the diaphragm and valve assembly of Fig. 2 and is taken along line 3—3 thereof.

In the illustrated embodiment of the invention, the fluid pressure brake system in general is shown in Fig. 1 as including a fluid pressure reservoir 5, control valves 6 and 7, a transfer or double check valve 8, and fluid pressure operated brake actuators 9 having pistons, not shown, mounted therein and connected to brake operating shafts 10 by means of piston rods 11, clevis pins 12 and brake levers 13, in a manner well known to those skilled in the brake art.

As shown in Fig. 2, the valve device 8 has a casing member 14 having an inlet port 15, an inlet cavity 16, an outlet cavity 17, an outlet port 18, and a communicating port 19 between said cavities which may include a bushing 20 carried by a bore formed in casing 14 as shown and having a valve seat portion 21 formed at the right end thereof for a purpose to be more fully described hereinafter. Another similar casing member 22 is arranged in opposed relationship with casing member 14, and is provided with a similarly disposed inlet port 23, inlet cavity 24, outlet cavity 25, outlet port 26, and a communicating port 27 between the cavities formed in a bushing 28 carried by casing 22. A valve seat 29 is formed as shown on the left end of the bushing 28.

In assembling the valve 8, the casing members 14 and 22 are secured together in opposed relationship as by means of bolts 30, the joint between the casing members being sealed by a combined resilient gasket and diaphragm member 31 clamped therebetween. The diaphragm member is provided with a port 32 registering with outlet cavities 17 and 25 and forms at its central portion a flexible partition between the inlet cavities 16 and 24, which effectively prevents the direct flow of fluid pressure from one cavity to the other. A pair of valve members 33 and 34 are attached to the diaphragm by means of a rivet 35 and may be normally held in spaced relationship with their corresponding valve seats 21 and 29 by the diaphragm.

The brake control valves 6 and 7, which are preferably of the well known self-lapping type, are connected to the supply reservoir 5 by conduits 36 and 37 and 36 and 38 respectively. Valve 6 has an outlet conduit 39 which is connected to the inlet port 15 of valve 8, and it will be apparent from the foregoing description that under normal conditions the control valve 6 will be in communication with the actuators 9 through conduit 39, port 15, inlet cavity 16, port 19, outlet cavity 17, outlet port 18, and conduits 40, 41 and 42, conduit 40 being connected to the outlet port 18 of valve 8. In like manner control valve 7 is normally connected to the brake actuators 9 through an outlet conduit 43 connected to the inlet port 23 of valve 8, inlet cavity 24, port 27, outlet cavity 25, and outlet port 26 which is connected to conduit 40 by means of conduit 44, and it is to be pointed out that with valves 6 and 7 in brake releasing position, the actuators 9 are connected with atmosphere by virtue of the fact that the control valves 6 and 7 when in release position serve to connect the conduits 39 and 43 respectively with corresponding exhaust conduits 45 and 46 provided on the control valves.

If the control valve 6, for example, is now operated to disconnect outlet conduit 39 from exhaust conduit 45 and to connect the fluid pressure supply conduit 37 with conduit 39, it will be apparent that fluid pressure will be conducted from reservoir 5 to actuators 9 through conduits 36 and 37, control valve 6, conduit 39, port 15, cavity 16, port 19, cavity 17, port 18 and conduits 40, 41 and 42, the fluid tending at the same time, by reason of port 32, to flow through cavity 25, port 27, cavity 24, port 23, conduit 43, valve 7 and exhaust conduit 46 to atmosphere, the valve 7 being in release position as heretofore described. Since the diaphragm 31, however, is of a flexible nature and is easily moved by small pressure differentials, the pressure of the fluid in inlet cavity 16 acts to move the central portion of diaphragm 31 to the right prior to the build up of a corresponding pressure on the right side of the diaphragm, thus moving the valve member 34 against valve seat 29 and effectively preventing the escape of fluid pressure from cavity 25 to atmosphere through valve 7 in the manner above described.

Since the effective area of diaphragm 31 is greater than that of valve member 34, it will be noted that when the pressures equalize in outlet cavities 17 and 25 there will be a corresponding force differential acting to hold valve member 34 on its seat, and that during subsequent brake releasing operation of control valve 6, the valve member 34 will be maintained against the seat, thus permitting exhaust of fluid pressure from actuators 9 to atmosphere through conduits 42, 41 and 44, outlet cavities 17 and 25 of transfer valve 8, port 19, inlet cavities 16, inlet port 15, conduit 39, control valve 6 and exhaust conduit 46.

In like manner the control valve 7 may be actuated to connect reservoir 5 with actuators 9 through conduits 36, 38 and 43, port 23 of transfer valve 8, inlet cavity 24, port 27, outlet cavities 25 and 17, ports 26 and 18, and conduits 44, 41 and 42, brake release operation of the valve 7 permitting release of fluid from the actuators to atmosphere through conduits 42, 41 and 44, outlet cavities 25 and 17, port 27, inlet cavity 24, conduits 43, control valve 7 and conduit 46. It will be readily apparent that control of the brake actuators by valve 7 will cause the diaphragm 31 to move to the left and seat the valve 33, thus effectively preventing the flow of fluid pressure from valve 7 to atmosphere through control valve 6.

With further reference to the foregoing description, it is pointed out that the ports 19 and 27 of transfer valve 8 cannot be closed at the same time by their associated valve members 33 and 34, thus preventing the possibility of a brake failure when both control valves are actuated concurrently, and at the same time allowing a control valve, operated to deliver a high pressure to the brake actuators, to actuate the transfer valve 8 to disconnect the actuators from the other control valve operated to deliver a lower pressure to the actuators.

While the invention has been illustrated and described herein with considerable particularity it is to be understood that the same is not limited to the form shown, but may receive a variety of mechanical expressions as will readily appear to those skilled in the art. Reference will, therefore, be had to the appended claims for a definition of the limits of the invention.

What is claimed is:

1. A transfer valve comprising a casing having a pair of inlet ports and a pair of outlet ports each in communication with the others, a pressure responsive device in said casing normally permitting communication between all of said ports and valve means controlled by said device for interrupting communication between said inlet ports and for selectively interrupting communication between one or the other of said inlet ports and said pair of outlet ports upon introduction into said casing of fluid pressure through said one or said other inlet port.

2. A transfer valve comprising a pair of casing members each having inlet and outlet cavities provided with ports, a port in each member connecting said inlet and outlet cavities, a diaphragm member having a port therethrough, and means for clamping said members together in opposed relationship whereby the diaphragm member forms a sealing gasket therebetween, the port in said diaphragm connecting said outlet cavities to form a common outlet chamber and the central portion of the diaphragm being so located with respect to said connecting ports as to normally permit communication between all of said ports and being effective on introduction of fluid pressure into one of said inlet cavities to disconnect the first named port of the other inlet cavity from said other ports.

ROY S. SANFORD.
WILLIAM J. ANDRES.